United States Patent
Kapfer et al.

(10) Patent No.: US 7,631,886 B2
(45) Date of Patent: Dec. 15, 2009

(54) TRAILER COUPLING FOR TRACTIVE VEHICLES, IN PARTICULAR AGRICULTURAL TRACTORS

(75) Inventors: Johannes Kapfer, Kaufbeuren (DE); Gottlieb Wolfle, Marktoberdorf (DE)

(73) Assignee: AGCO GmbH (DE)

( * ) Notice: Subject to any disclaimer, the term of this patent is extended or adjusted under 35 U.S.C. 154(b) by 99 days.

(21) Appl. No.: 11/835,788

(22) Filed: Aug. 8, 2007

(65) Prior Publication Data
US 2008/0054599 A1  Mar. 6, 2008

(30) Foreign Application Priority Data
Aug. 9, 2006  (GB) .................................. 0615772.1

(51) Int. Cl.
*B60D 1/00* (2006.01)
*B60D 1/40* (2006.01)

(52) U.S. Cl. .................. 280/504; 280/416.2; 280/511; 280/478.1; 280/479.3; 280/490.1; 280/491.1; 280/491.2

(58) Field of Classification Search .......... 280/504, 280/416.2, 511, 478.1, 479.3, 490.1, 491.1, 280/491.2
See application file for complete search history.

(56) References Cited

U.S. PATENT DOCUMENTS

| | | | | |
|---|---|---|---|---|
| 4,015,855 A * | 4/1977 | Murray | ..................... | 280/416.2 |
| 5,009,446 A * | 4/1991 | Davis | ..................... | 280/479.2 |
| 5,226,657 A * | 7/1993 | Dolphin | ................... | 280/478.1 |
| 5,560,628 A * | 10/1996 | Horn | ........................ | 280/402 |
| 6,155,588 A * | 12/2000 | Maxey | ...................... | 280/488 |
| 6,412,570 B1 * | 7/2002 | Pruitt et al. | ................. | 172/449 |
| 6,502,845 B1 * | 1/2003 | Van Vleet | ................ | 280/491.1 |
| 6,575,488 B2 * | 6/2003 | Massey | .................... | 280/490.1 |
| 6,585,280 B1 * | 7/2003 | Wiers | ........................ | 280/468 |
| 7,219,915 B2 * | 5/2007 | Christensen | ............. | 280/490.1 |
| 7,380,811 B2 * | 6/2008 | Rehme | ....................... | 280/483 |
| 2001/0038191 A1 * | 11/2001 | Massey | ................... | 280/490.1 |
| 2006/0284396 A1 * | 12/2006 | Smith | ....................... | 280/490.1 |
| 2008/0073872 A1 * | 3/2008 | Scott | ......................... | 280/477 |
| 2008/0129011 A1 * | 6/2008 | Bouwkamp | ............. | 280/490.1 |
| 2008/0277903 A1 * | 11/2008 | Anderson et al. | .......... | 280/477 |

* cited by examiner

*Primary Examiner*—Lesley Morris
*Assistant Examiner*—Marlon A Arce

(57) ABSTRACT

A trailer coupling for tractive vehicles, in particular agricultural tractors, consisting of two vertical guidance cheeks (7), fitted with lateral spacing to the rear of the vehicle, the guidance cheeks including vertical slots (7a) and a bearing member (11) held detachably at the lower end region of the guidance cheeks, on which a coupling member (12) is arranged for attaching an implement. In the case of a prior art trailer coupling, all forces transmitted from the attached implement to the coupling member used, a ball coupling (12) for example, are conducted via the bearing member (11) into the guidance cheeks (7). Thus this involves the undesirable necessity of having to dimension the guidance cheeks in a robust manner, which in turn leads to space problems within the tail end region of the vehicle. Therefore a trailer coupling is to be created which reduces the load on the guidance cheeks (7), when the forces of the attached implement are conducted into the rear of the vehicle. This is achieved by arranging the bearing member (11) to extend as far as a bearing block (10) fitted to the rear of the vehicle and connecting the bearing member to the bearing block (10) via at least one connecting element (17), which transmits dissipating forces of the implement exclusively in the vehicle's longitudinal direction. The bearing member (11) is also guided through the guidance cheeks (7) via further connecting elements (18, 18a, 19), which transmit exclusively vertical and transverse forces of the implement.

8 Claims, 6 Drawing Sheets

TRAILER COUPLING FOR TRACTIVE VEHICLES, IN PARTICULAR AGRICULTURAL TRACTORS

This application is based on, and claims the benefit of priority to, UK application GB 0615772.1, filed 9 Aug. 2006, which priority application is hereby incorporated by reference.

BACKGROUD OF THE INVENTION

1. Field of the Invention

The invention relates to a trailer coupling for tractive vehicles, in particular agricultural tractors, consisting of two vertical guidance cheeks fitted with lateral spacing to the rear of the vehicle, the guidance cheeks including vertical slots and a bearing member held detachably at the lower end region of the guidance cheeks on which a coupling member is arranged for attaching an implement.

2. Description of Related Art

For connection of an implement towed by an agricultural tractor, coupling members are available in various versions, known under the designations of 'ball coupling', 'Piton fix' and 'drawbar'. Usually not all these versions are used on a specific agricultural tractor, but depending on the work application for which the tractor is used only one or two versions of coupling member are used. Thus for example in Germany alternate use of a ball coupling and a drawbar is usual, whilst in France the drawbar and the Piton fix are predominantly used. A trailer coupling which facilitates changing of one version with another is disclosed in DE 101 18 862 C1. Its bearing member can be inserted in horizontal guide grooves in the guidance cheeks which are turned towards each other and are locked in position by vertical socket pins. Since the play-afflicted socket pins alone cannot hold the bearing member in a shakeproof and wear-resistant manner against the guidance cheeks, located in the guide grooves are strips which are pressed by bolts against the bearing member and therefore brace the bearing member against the socket pins. After the strips have been unbolted and the socket pins removed the bearing member with the coupling member arranged thereon can be replaced by a bearing member with a different type of coupling member. For shake-free fitting of the bearing member a not insignificant expenditure is therefore required, particularly since the guidance cheeks for this purpose must have separate horizontal slots in addition to the existing vertical slots.

Furthermore, in the case of the prior art trailer coupling, all forces transmitted from the attached implement to the coupling member used, a ball coupling for example, are conducted via the bearing member to the guidance cheeks. These forces act longitudinally and vertically relative to the vehicle. Since with large agricultural tractors the longitudinal force can reach 9t and the vertical force 4.5t, the guidance cheeks must be robustly dimensioned, in order to provide the necessary stability. The space needed for this however often cannot be made available. On the one hand this lack of space arises because, apart from the guidance cheeks, the lower links of the three point implement attachment linkage whose lateral freedom of movement is to be restricted as little as possible run on the outside of the cheeks. On the other hand a vehicle power-takeoff, for connection to the drive shaft of an implement towed and driven by the vehicle is arranged between the guidance cheeks.

The object of the invention is seen in creating a trailer coupling of the type described initially which provides a safe, technically simple and thus economic-to-produce fitting of the bearing member which in addition relieves the guidance cheeks when the forces of the attached implement are transmitted into the rear of the vehicle.

BRIEF SUMMARY OF THE INVENTION

This object is achieved in that the bearing member extends as far as a bearing block fitted to the rear of the vehicle and is connected to the bearing block via at least one connecting element, which transmits dissipating forces of the implement exclusively in the vehicle's longitudinal direction, and in that the bearing member is guided through the guidance cheeks via further connecting elements, which transmit exclusively vertical and transverse forces of the implement.

As a result the trailer force is split into a longitudinal and a vertical component. Both force components can therefore be conducted via different force entry points into the vehicle chassis. The load at each of these force entry points is therefore substantially reduced. While the component of the trailer force, which runs in the vehicle's longitudinal direction and is approximately twice as great as its component in the vertical direction, is conducted directly into the sturdy rear axle housing, the guidance cheeks are only loaded by the vertical component of the trailer force and can thus be designed more compactly.

Claim 2, according to which the at least one connecting element is a socket pin, demonstrates a generally proven and economic solution for problem-free connection of the parts.

The proposal according to Claim 3 advantageously makes use of the vertical slots, existing in any case, of the guidance cheeks, since support members are provided as the further connecting elements, the support members engage in the vertical slots of the guidance cheeks and are connected with the bearing member with axial play by socket pins extending in the vehicle's longitudinal direction. Although the connecting elements in this case are held in the vehicle's longitudinal direction, no longitudinal component of the trailer force can be conducted into the guidance cheeks here, since the connecting elements are connected to the bearing member by socket pins extending in the vehicle's longitudinal direction, which permit slight movement of the bearing member in the vehicle's longitudinal direction.

Finally, in order to facilitate fitting and dismantling of the bearing member, the bearing block is provided with a passage accommodating the front most region of the bearing member and a shoulder of the bearing member engages the block to determine the position of the bearing member in the vehicle's longitudinal direction.

An expedient further arrangement of the invention is seen in the fact that the bearing member runs underneath the guidance cheeks and protrudes laterally beyond the guidance cheeks, wherein the laterally protruding regions support coupling means for the connection of hydraulic cylinders. In this case the spacing of the coupling means can be implemented as wide as possible, which improves the operational mode of the hydraulic cylinders attached thereto, and is only limited by the lateral freedom of movement of the lower connecting links of the implement attachment linkage, with which practically all agricultural tractors are fitted.

BRIEF DESCRIPTION OF DRAWINGS

Further advantageous details and features of the invention will become evident from the following description on the basis of the following drawings, wherein.

DETAILED DESCRIPTION OF PREFERED EMBODIMENTS

Figure 1:
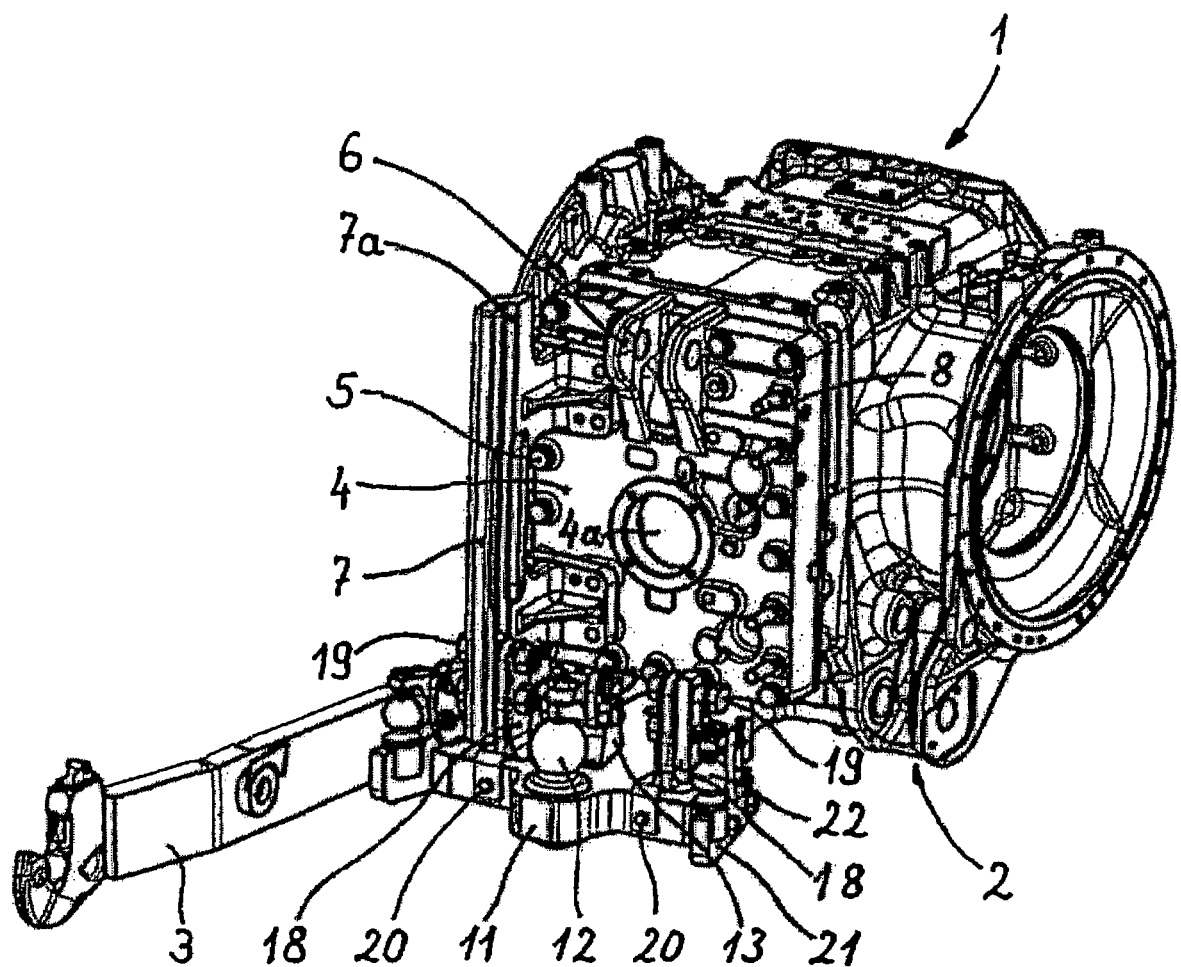
FIG. 1 shows the tail region of an agricultural tractor with a rear axle housing and a first embodiment of a trailer coupling attached thereto.

In FIG. 1 part of the rear axle housing 1 of a tractor, which has linkage points 2 for the lower connecting links 3 of an implement hitch is shown. Only the left lower connecting link 3, seen in the vehicle's longitudinal direction, is shown.

Between the lower connecting links 3 the base plate 4 of a trailer coupling is fitted by means of bolts 5 to the rear wall of the rear axle housing 1. A centrally arranged upper link mounting point 6 for an upper link of the implement hitch is located on the upper part of the base plate 4. The plate 4 includes an opening 4a, through which a power-takeoff (not shown) for driving an attached implement extends into the region between two guidance cheeks 7. The guidance cheeks 7 run in the vertical direction and are bolted onto the lateral boundary regions of the base plate 4 by means of bolts 8. Slots 7a running in the longitudinal direction in the guidance cheeks 7 serve to hold the base plate of a height-adjustable trailer coupling, not shown. The trailer coupling can be fixed in different height positions relative to the guidance cheeks 7, for the purpose of which several borings 7b, over the entire length of the guidance cheeks 7, run out from the base of the slots 7a, into which at least one horizontally extending pin, mounted in the base plate, is inserted on either side.

As is evident from the remaining drawings, a bearing block 10 is fitted in the middle of the vehicle to the lower surface of the rear axle housing 1 by means of bolts. The bearing block 10 serves to accommodate the end region, near the vehicle, of a bearing member 11, which supports a central coupling ball 12 in its end region, remote from the vehicle, through which an implement, a trailer for example, can be connected to the vehicle by its coupling eye. A holding-down device 13, which reliably prevents the connection becoming loose during operation is assigned to the coupling ball 12.

Figure 2:
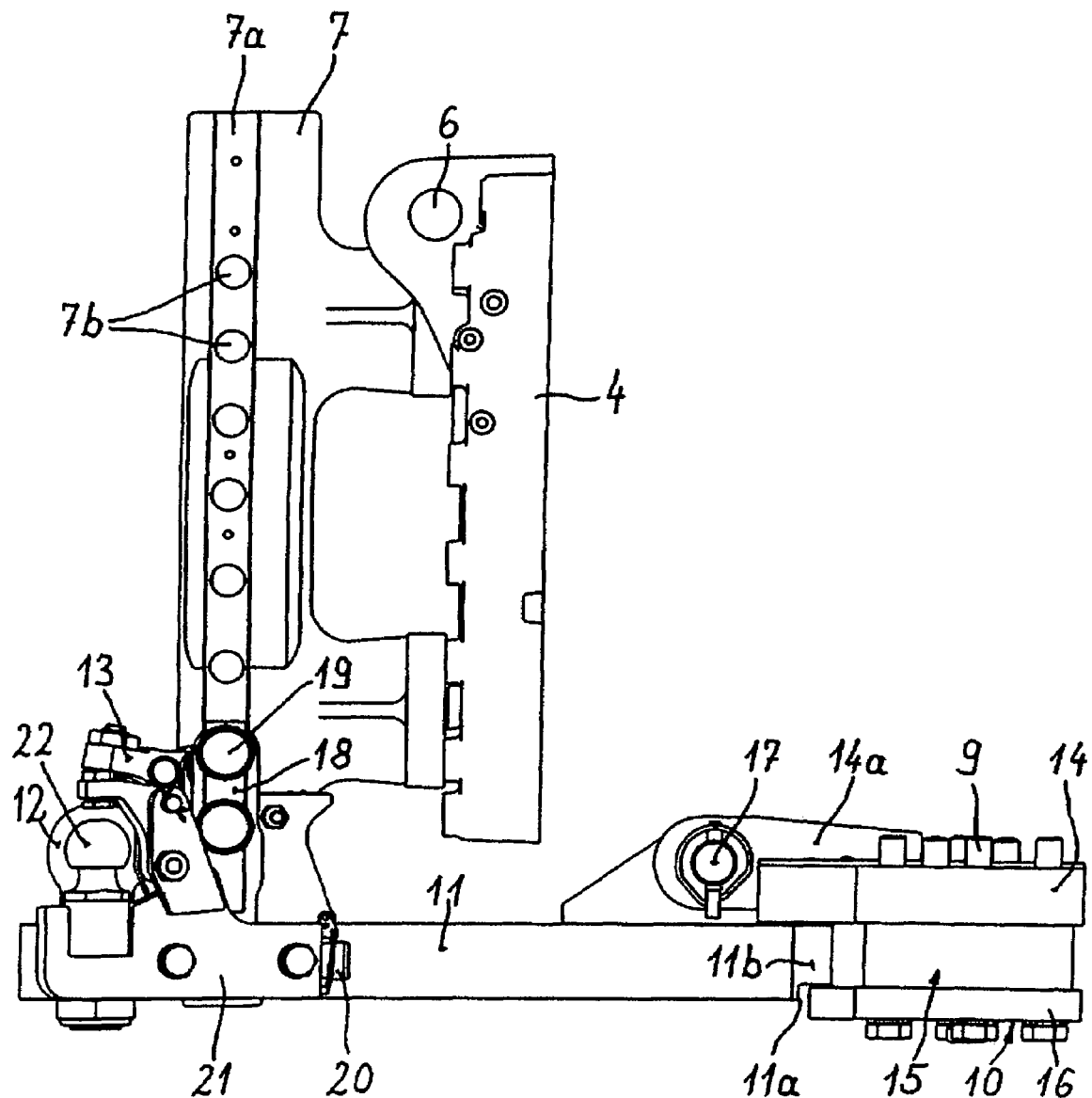
FIG. 2 is a view of the trailer coupling according to FIG. 1 seen from the right side of the vehicle, with the bearing member fitted.

The bearing block 10 consists of an upper plate 14, fitted to the rear axle housing 1 and a lower plate 16 held at a distance by lateral blocks 15 which together form a passage 10a therebetween. The front most region of the bearing member 11 near the vehicle, while forming a shoulder 11a, is provided with an extension 11b which, over a certain length, defined by the position of the shoulder 11a, engages in the passage 10a. On the upper plate 14 are welded two laterally spaced bearing eyes 14a, in which a socket pin 17 is mounted horizontally and transversely to the vehicle's longitudinal direction. The bearing member 11 in this region includes a lug 11c, engaging between the bearing eyes 14a, with a bore, which accommodates the socket pin 17, when the bearing member is attached to the vehicle as shown in FIG. 2.

A recess 11d is provided on each side of the member 11 in the end region, remote from the vehicle. This recess is below the guidance cheeks 7. A support member 18, which engages in the groove 7a in the lower region of the guidance cheeks 7 via a block 18a is held there by bolts 19 and is sunk into the recess 11d. The support member 18 is connected to the bearing member 11 by a socket pin 20 which extends through the support member 18 and the bearing member 11 in the vehicle's longitudinal direction. The width of the part of the support member 18 engaging in the recess 11d, in the vehicle's longitudinal direction, is smaller than the corresponding dimension of the recess 11d. Thus any possible movement of the bearing member 11 in the vehicle's longitudinal direction is therefore not transmitted to the support members 18 or into the associated guidance cheeks 7 and does not lead to any loading of these structural parts in the vehicle's longitudinal direction. The component running horizontally, in the vehicle's longitudinal direction, of the trailer force transmitted from a trailer to the bearing member 11 is therefore taken up by the socket pin 17, while its vertical component is taken up by the guidance cheeks 7.

Figure 3:
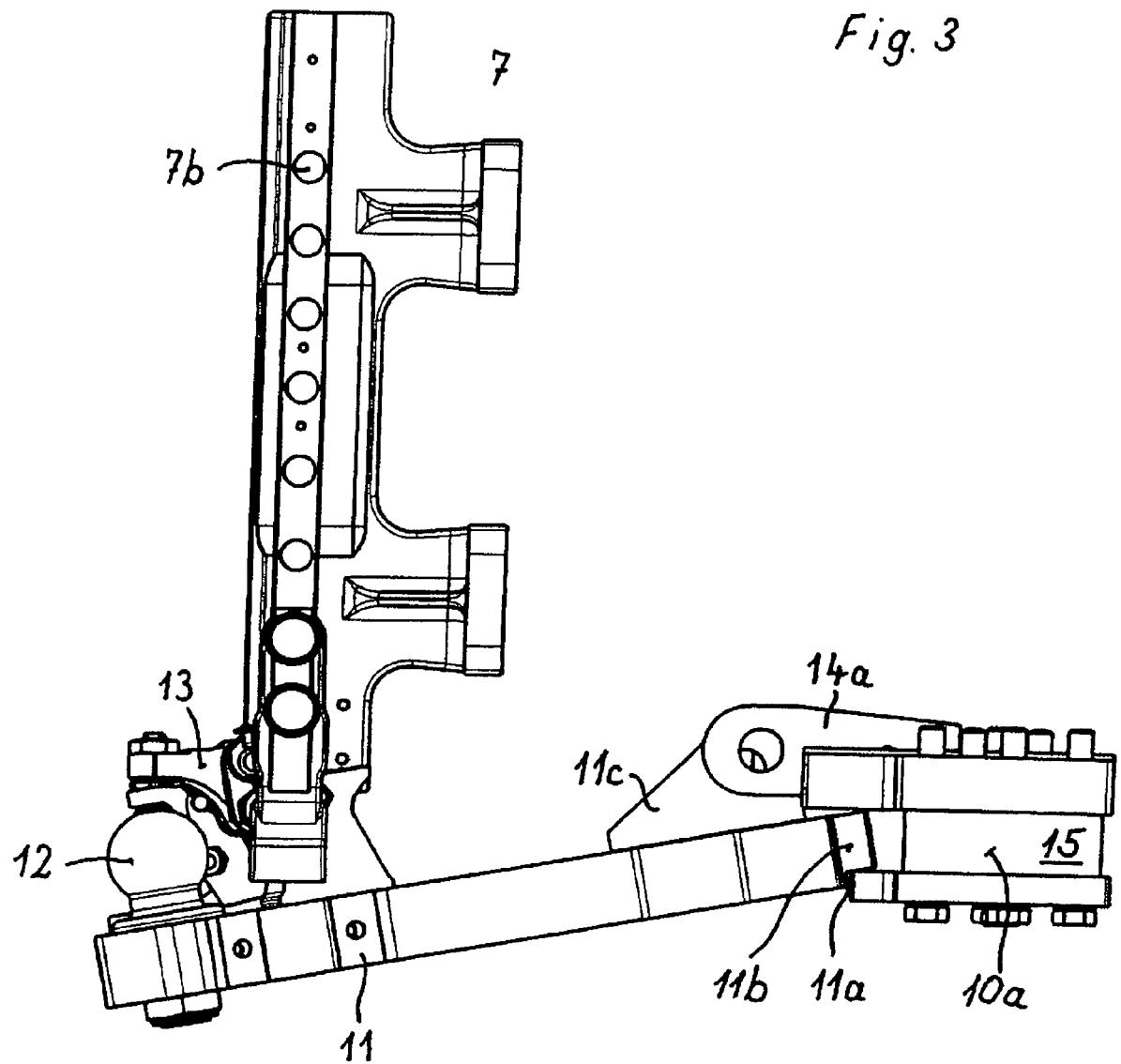
FIG. 3 is a view of the trailer coupling according to FIG. 2 with bearing member prepared for fitting.

In order to attach the bearing member 11 to the vehicle, the extension 11b, as shown in FIG. 3, is inserted into the passage 10a, while the end region of bearing member 11, remote from the vehicle, still lies on the ground. Subsequently the end region that is remote from the vehicle is lifted manually and the support member 18 which always remaining in the slots 7a, are connected to the bearing member 11 by the insertion of the socket pins 20 into the bearing member 11. Finally the end region near the vehicle of the bearing member 11 is connected to the bearing block 10 by inserting socket pin 17.

Figure 4:
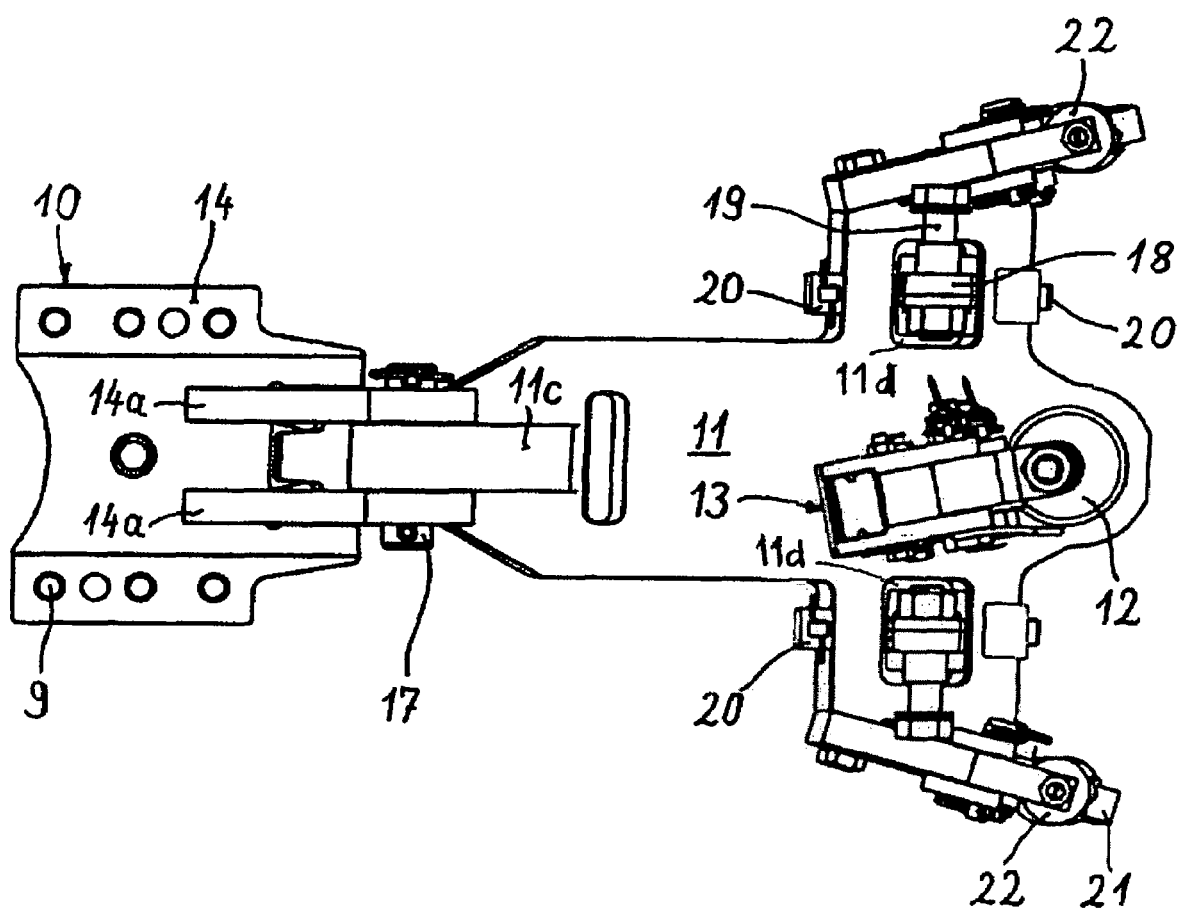
FIG. 4 is a view of the trailer coupling according to FIG. 1 seen from above.

As is also evident from FIG. 1, the end region, remote from the vehicle, of the bearing member 11 protrudes laterally beyond the guidance cheeks 7. Within these regions the bearing member 11, as shown in FIG. 4, is detachably fitted with plates 21 which carry coupling balls 22 for connection of hydraulic cylinders, not shown, for turning a steerable axle or axles of a trailer being towed by the tractor. Both plates 21 run at an angle to the vehicle's longitudinal direction, which corresponds at least approximately to angle of the lower connecting links 3 in this region.

Figure 5:
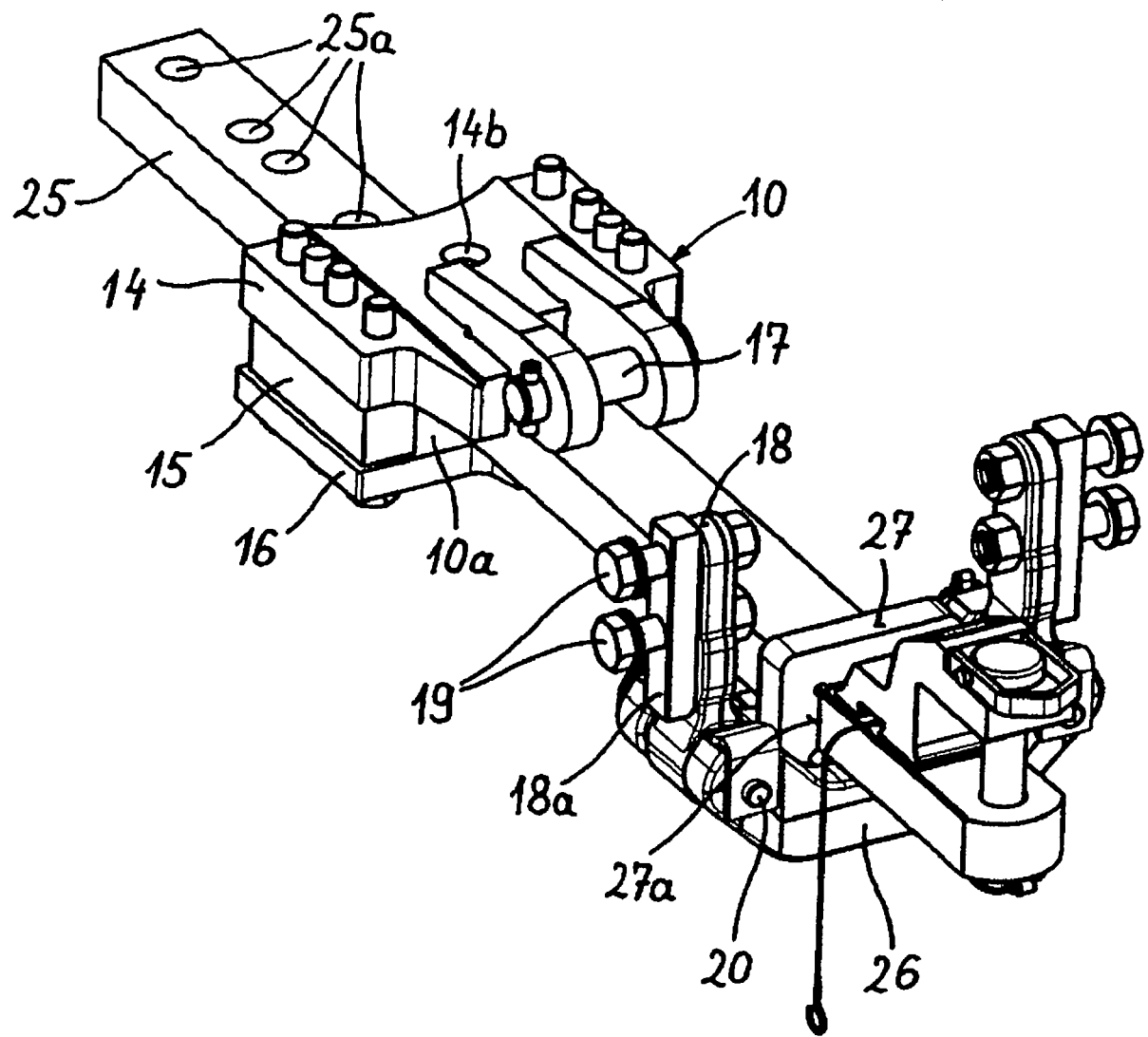
FIG. 5 is a perspective view from above of a second embodiment of a trailer coupling using a bearing member in the form of a drawbar.
Figure 6:
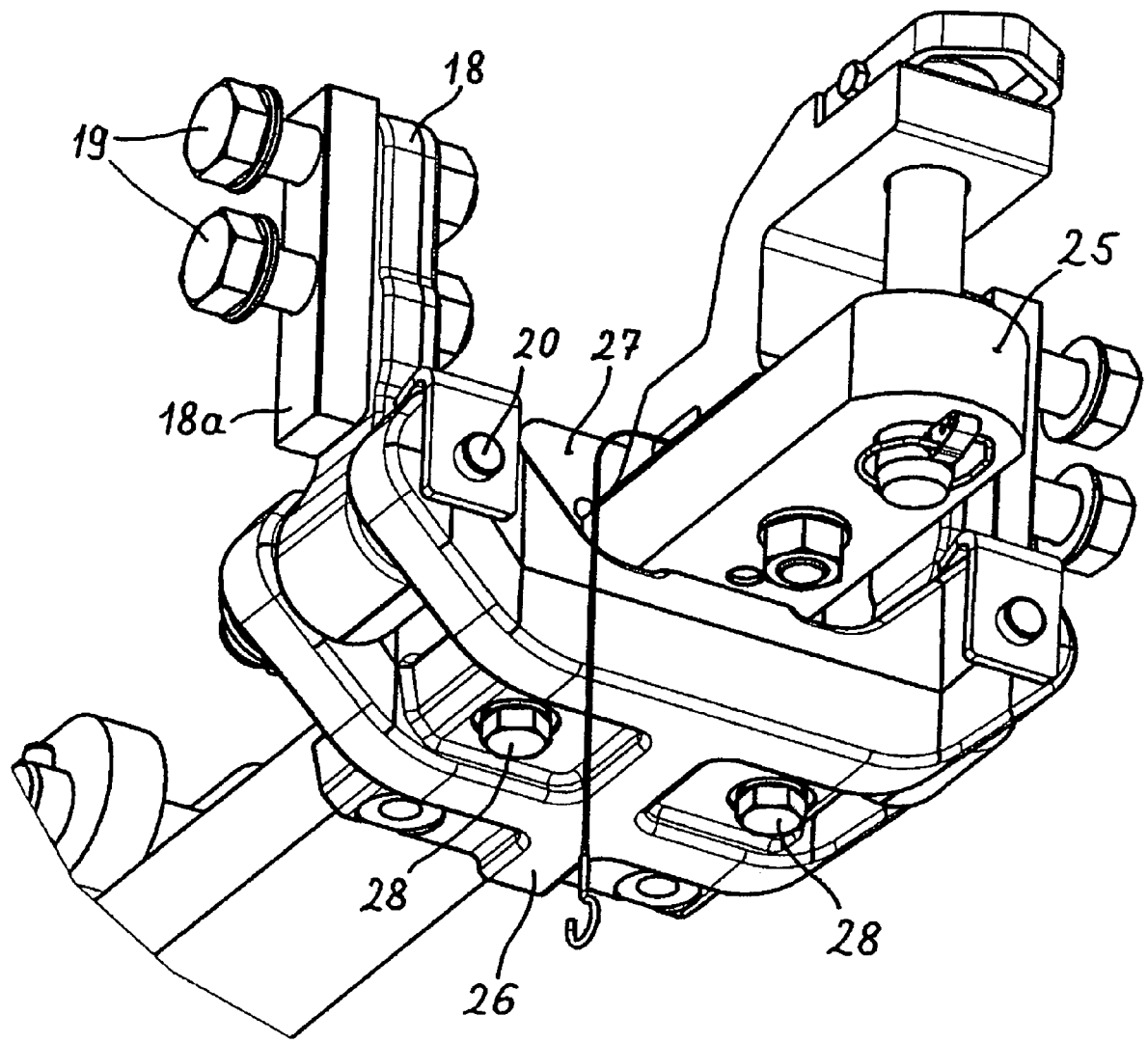
FIG. 6 is a perspective view from below of the embodiment according to FIG. 5.

The embodiment according to FIG. 5 only differs slightly from that described in FIGS. 1 to 4. The bearing block 10, described there, bolted onto the lower surface of the rear axle housing, can also be used here. The same applies to the support members 18 which, if the bearing member 11 is changed, remain connected to the guidance cheeks 7 (not shown here) wherein the blocks 18a engage in the slots 7a.

Here however the bearing member 25 is a drawbar, which is inserted into the passage 10a of the bearing block 10. The position of the bearing member 25 can be adjusted in the vehicle's longitudinal direction by means of socket pin 17, which is inserted into a vertical boring 14b in the plates 14, 16 and a selectable bore 25a in the bearing member 25.

The support members 18 are connected together by means of socket pins 20 via a bridge 26. The bearing member 25 rests on the bridge 26. Lateral and vertical movements of the bearing member 25 are prevented, since the bearing member 25 is guided in an opening formed by a U-shaped clip 27. The clip 27 is bolted onto the bridge 26 by means of bolts 28.

We claim:

1. In a trailer coupling for tractive vehicles, in particular agricultural tractors, comprising two vertical guidance cheeks (7), fitted with lateral spacing to the rear of the vehicle, the guidance cheeks including vertical slots and a bearing member (11), held detachably at the lower end region of the guidance cheeks, on which a coupling member (12) is arranged for attaching an implement, wherein the bearing member (11, 25) extends as far as a bearing block (10) fitted to the rear of the vehicle and is connected to the bearing block (10) via at least one connecting element (17), which transmits dissipating forces of the implement exclusively in the vehicle's longitudinal direction, and that the bearing member (11, 25) is guided through the guidance cheeks (7) via further connecting elements (18, 18*a*, 19), which transmit exclusively vertical and transverse forces of the implement, and wherein the support members (18) are provided as the further connecting elements, which support members engage in the vertical slots (7*a*) of the guidance cheeks (7) and are connected with the bearing member (11, 25) with axial play by socket pins (20) extending in the vehicle's longitudinal direction.

2. A trailer coupling according to claim 1, in which the at least one connecting element is a socket pin (17).

3. A trailer coupling according to claim 1, in which the bearing block (10) is provided with a passage (10*a*) accommodating a front most region (11*b*) bearing member (11).

4. A trailer coupling according to claim 3, in which the front most region (11*b*) of the bearing member (11) engages in the passage (10*a*) and a shoulder (11*a*) of the bearing member engages the block (10) to determine the position of the bearing member (11) in the vehicle's longitudinal direction.

5. A trailer coupling according to claim 1, in which the bearing member (11) runs underneath the guidance cheeks (7).

6. In a trailer coupling for tractive vehicles, in particular agricultural tractors, comprising two vertical guidance cheeks (7), fitted with lateral spacing to the rear of the vehicle, the guidance cheeks including vertical slots and a bearing member (11), held detachably at the lower end region of the guidance cheeks, on which a coupling member (12) is arranged for attaching an implement, wherein the bearing member (11, 25) extends as far as a bearing block (10) fitted to the rear of the vehicle and is connected to the bearing block (10) via at least one connecting element (17), which transmits dissipating forces of the implement exclusively in the vehicle's longitudinal direction, and that the bearing member (11, 25) is guided through the guidance cheeks (7) via further connecting elements (18, 18*a*, 19), which transmit exclusively vertical and transverse forces of the implement, wherein the bearing member (11) runs underneath the guidance cheeks (7), and wherein the bearing member (11) protrudes laterally beyond the guidance cheeks (7) and the laterally protruding regions of the bearing member (11) support coupling means (22) for the connection of hydraulic cylinders.

7. A trailer coupling according to claim 1, in which the bearing member (25) is a drawbar, which is adjustably guided on the vehicle by a passage (10*a*) in the bearing block (10) which accommodates the front region (11*b*) of the drawbar, the drawbar also resting on a bridge (26) coupled with the support member (18) by means of the socket pins (20).

8. A trailer coupling according to claim 7, in which the bridge (26) and a U-shaped clip (27), detachably fitted thereto, form an opening, in which the bearing member (25) is adjustably guided.

* * * * *